2,748,148
Patented May 29, 1956

2,748,148
SUBSTITUTED N-CARBAMYL GLYCIDAMIDES

Otis E. Fancher and Dale A. Stauffer, Elkhart, Ind., assignors to Miles Laboratories, Inc., Elkhart, Ind., a corporation of Indiana No Drawing. Application January 2, 1953,
Serial No. 329,477

4 Claims. (Cl. 260—348)

This invention relates to new compounds and compositions of matter and the method of preparing the same. More particularly, the invention relates to the synthesis of glycidureides represented by the following general formula:

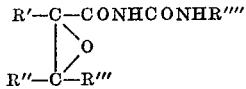

wherein R', R" and R'" can be H, alkyl, aryl, alkaryl or nuclear substituted aryl and aralkyl groups and wherein R"" represents either H or an acyl group. In addition R'+R" can be a carbocyclic ring residue.

These glycidureides, which as epoxides are analogs of urea derivatives of substituted crotonic acid, have proven to have pharmacological activity as sedatives and hypnotics without producing any of the common detrimental effects such as loginess and ataxia after the period of sedation or hypnosis has passed. Moreover, the great difference between lethal and average therapeutic doses, as well as their failure to produce addiction, makes these compounds superior to the barbiturate sedatives most widely used today.

Among those compounds comprehended by the present invention are 2-ethyl-2,3-epoxybutyrylurea, 2-ethyl-3-methyl-2,3-epoxybutyrylurea, 1,2-epoxyhexanhydrobenzoylurea, and 2-ethyl-2,3-epoxyhexanoylurea.

The method of synthesis of these compounds entails an oxygenation of the corresponding alpha, beta unsaturated ureide as represented by the following detailed description of the synthesis of 2-ethyl-3-methyl-2,3-epoxybutyrylurea.

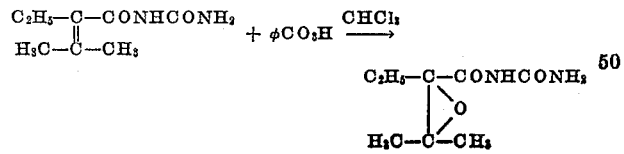

8.5 gm. of 2-ethyl-3-methylcrotonylurea was dissolved in 195 cc. of chloroform containing 8.19 gm. of perbenzoic acid. After standing for 24 hours in an ice bath and 16 hours at room temperature 6.95 gm. of the perbenzoic acid (the theoretical quantity) had been consumed. The solution was shaken with 30 cc. of 10 per cent aqueous sodium hydroxide and was then washed with two 50 cc. portions of cold water. After drying over sodium sulfate the chloroform was removed by distillation of reduced pressure. The solid residue was crystallized from a mixture of benzene and Skellysolve C. The colorless crystals thus obtained weighed 7.2 gm. and melted at 165–166° and depressed the melting point of the starting material. Per cent nitrogen found was 14.56 as compared to the theoretical 15.05 per cent.

As oxidants peracids such as perbenzoic, monoperphthalic, or perbenzoic acid formed in situ from benzaldehyde and atmospheric oxygen are suitable for our process.

2-ethylcrotonylurea and 2-ethyl-2-hexenoylurea have been similarly treated to give the corresponding glycidureides.

Having thus described our invention we claim:

1. Compositions of matter having the formula

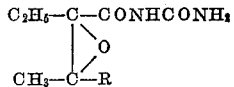

wherein R is selected from the group consisting of H and methyl.

2. 2-ethyl-2,3-epoxybutyrylurea having the formula

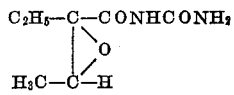

3. 2-ethyl-3-methyl-2,3-epoxybutyrylurea having the formula

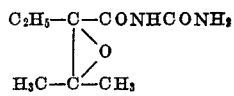

4. The method of making glycidureides which comprises oxidizing the double bond of an alpha, beta unsaturated ureide with a peraromatic-carboxylic acid in a chloroform medium.

References Cited in the file of this patent
UNITED STATES PATENTS
2,493,090    Shelton _____ Jan. 3, 1950